United States Patent
Schröer et al.

(10) Patent No.: US 8,874,438 B2
(45) Date of Patent: Oct. 28, 2014

(54) USER AND VOCABULARY-ADAPTIVE DETERMINATION OF CONFIDENCE AND REJECTING THRESHOLDS

(75) Inventors: Andreas Schröer, München (DE); Tobias Stranart, Heidelberg (DE); Michael Wandinger, München (DE)

(73) Assignee: Siemens Aktiengesellschaft, Munich (DE)

( * ) Notice: Subject to any disclaimer, the term of this patent is extended or adjusted under 35 U.S.C. 154(b) by 2113 days.

(21) Appl. No.: 10/592,526

(22) PCT Filed: Jan. 27, 2005

(86) PCT No.: PCT/EP2005/050342
§ 371 (c)(1),
(2), (4) Date: Oct. 9, 2007

(87) PCT Pub. No.: WO2005/088607
PCT Pub. Date: Sep. 22, 2005

(65) Prior Publication Data
US 2007/0213978 A1 Sep. 13, 2007

(30) Foreign Application Priority Data
Mar. 12, 2004 (DE) .......................... 10 2004 012 206

(51) Int. Cl.
*G10L 15/07* (2013.01)
*G10L 15/06* (2013.01)

(52) U.S. Cl.
CPC ................. *G10L 15/07* (2013.01); *G10L 15/06* (2013.01)
USPC ........................................................ 704/231

(58) Field of Classification Search
USPC .......................................................... 704/231
See application file for complete search history.

(56) References Cited

U.S. PATENT DOCUMENTS

| | | | |
|---|---|---|---|
| 4,181,821 A | 1/1980 | Pirz et al. | |
| 5,625,748 A * | 4/1997 | McDonough et al. | 704/251 |
| 6,473,735 B1 | 10/2002 | Wu et al. | |
| 6,778,959 B1 * | 8/2004 | Wu et al. | 704/256 |
| 6,983,246 B2 * | 1/2006 | Kepuska et al. | 704/241 |
| 7,089,188 B2 * | 8/2006 | Logan et al. | 704/270 |
| 7,203,643 B2 * | 4/2007 | Garudadri | 704/233 |
| 7,319,956 B2 * | 1/2008 | Bossemeyer, Jr. | 704/243 |

(Continued)

FOREIGN PATENT DOCUMENTS

| | | |
|---|---|---|
| DE | 29 53 262 C2 | 2/1988 |
| EP | 0 763 816 A2 | 3/1997 |

(Continued)

OTHER PUBLICATIONS

Lopez-Cozar et al.; A New Word-Confidence Threshold Technique to Enhance the Performance of Spoken Dialogue Systems; Eurospeech '99; vol. 3; 1999; pp. 1395-1398.

*Primary Examiner* — Michael N Opsasnick
(74) *Attorney, Agent, or Firm* — Staas & Halsey LLP

(57) ABSTRACT

User and vocabulary-adaptive determination of confidence and rejecting thresholds. A confidence measure for voice recognition is provided, by which during a voice recognition, a theoretic identification result is deducible or already given. The recognition process is carried out based upon the theoretic identification result and a confidence measure of the theoretic identification result is further adapted based upon the recognition process.

12 Claims, 3 Drawing Sheets

(56) References Cited

U.S. PATENT DOCUMENTS 7,363,224 B2 * 4/2008 Huang et al. ................ 704/252
7,447,635 B1 * 11/2008 Konopka et al. ............ 704/275
7,941,313 B2 * 5/2011 Garudadri et al. ........... 704/208

FOREIGN PATENT DOCUMENTS

| EP | 1 011 094 A1 | 6/2000 |
| EP | 1 377 000 A1 | 1/2004 |
| WO | 99/13456 | 3/1999 |

* cited by examiner

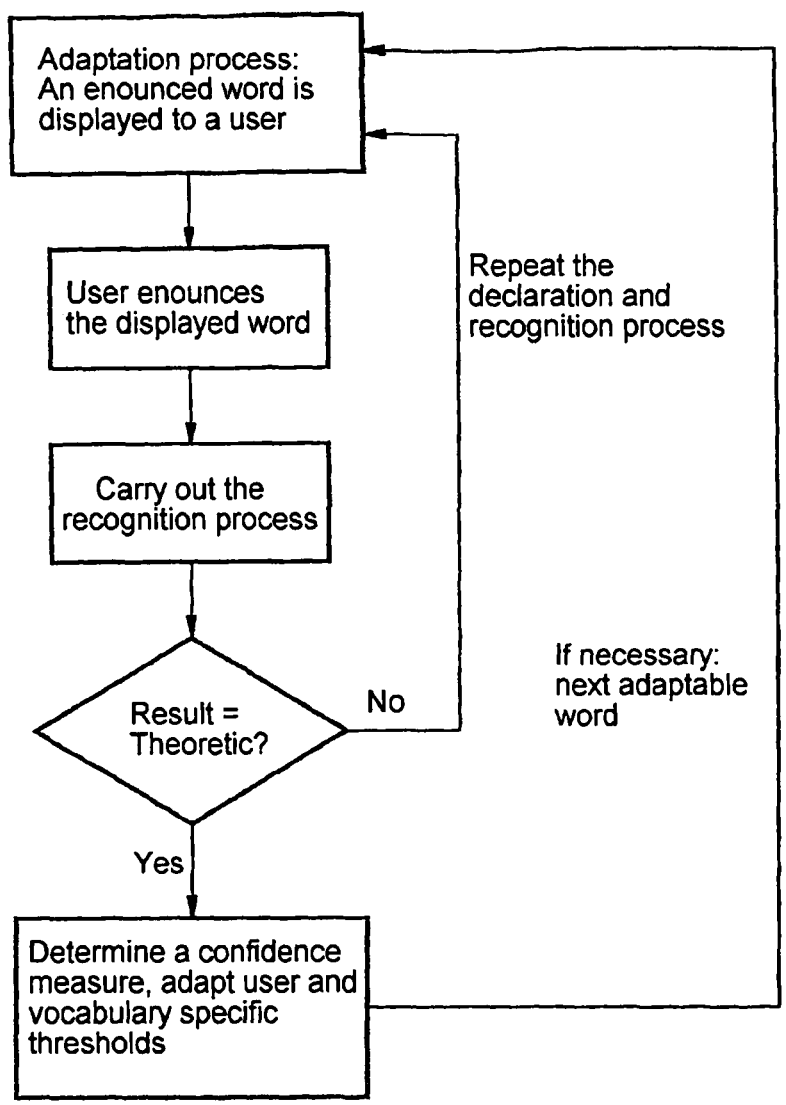

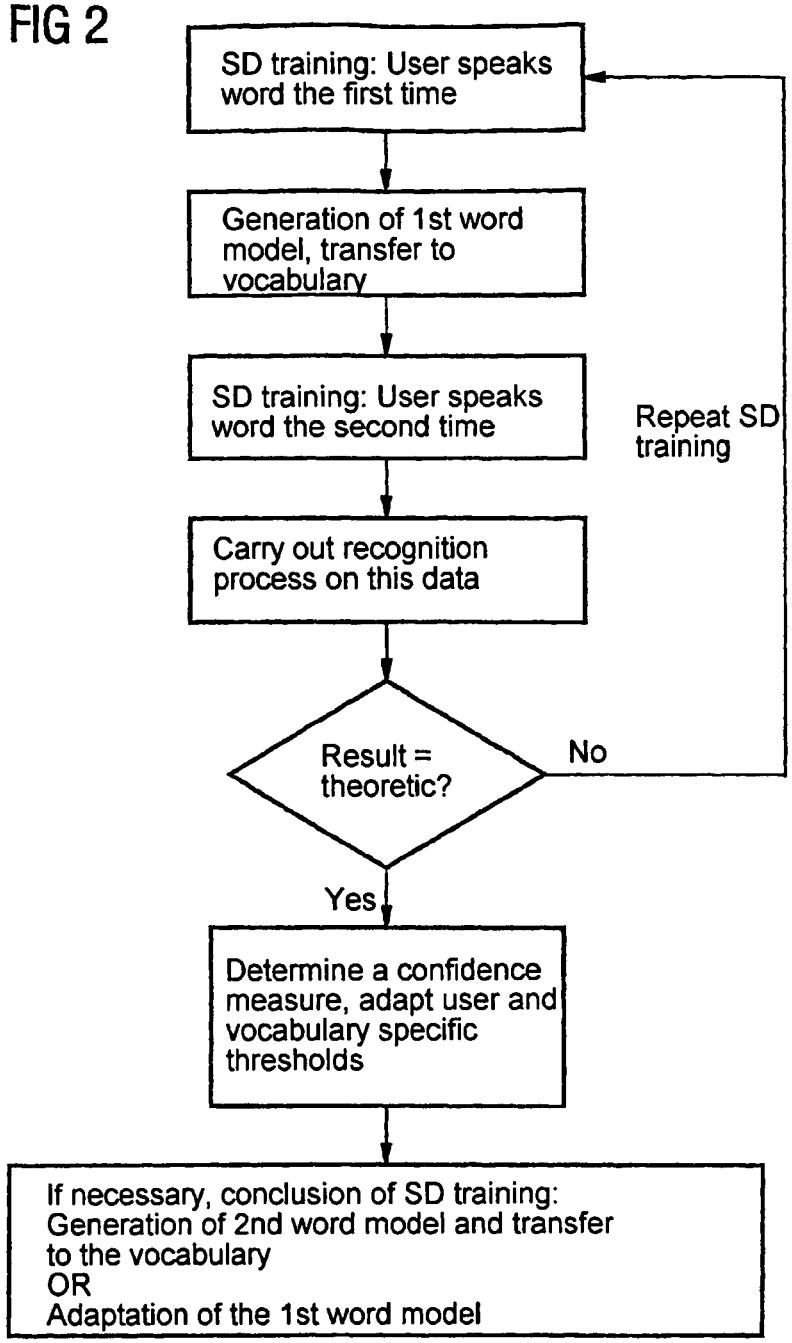

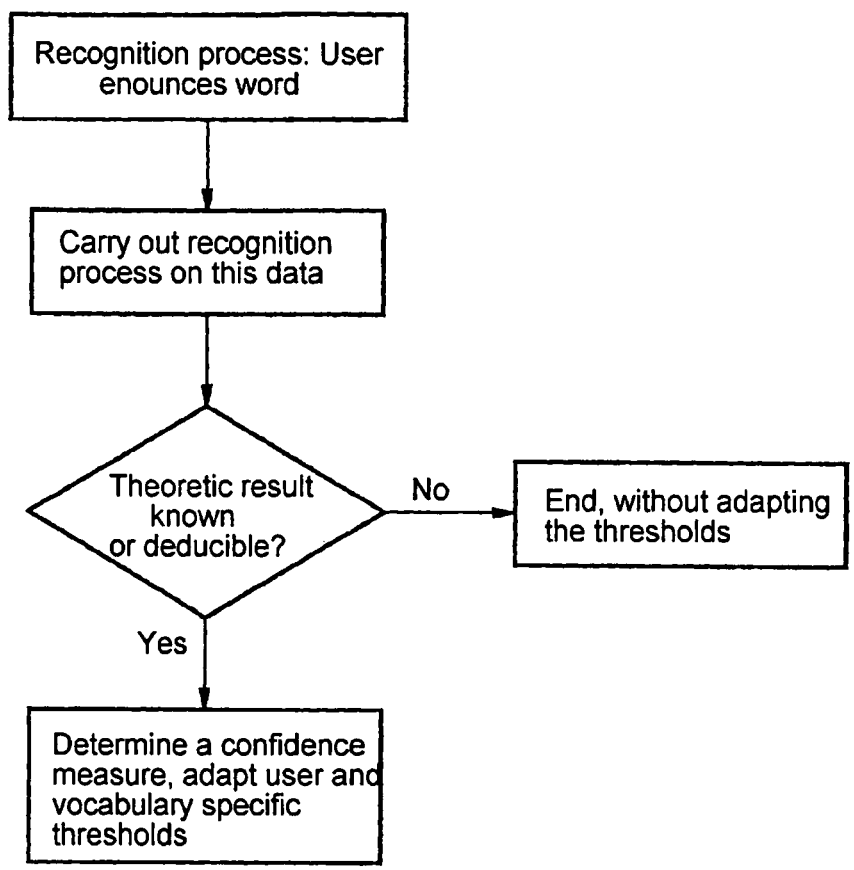

USER AND VOCABULARY-ADAPTIVE DETERMINATION OF CONFIDENCE AND REJECTING THRESHOLDS

CROSS REFERENCE TO RELATED APPLICATIONS

This application is based on and hereby claims priority to German Application No. 10 2004 012 206.7 filed on Mar. 12, 2004, the contents of which are hereby incorporated by reference.

BACKGROUND

Recognition of the human voice is currently employed in a multitude of mobile devices such as cell phones, personal digital assistants (PDAs) and wearables (MP3 players, watch phones, etc.). A very important criterion here for acceptance of a voice recognition system by the user is the rejection of words which are not contained in the recognized vocabulary (out-of-vocabulary rejection, OOV rejection).

The underlying technical method used here for speaker-independent voice recognition involves the classification of recognition results into categories for reliability of recognition, e.g. [reliably recognized, unreliably recognized, not in the vocabulary]. Typically the number and names of these categories vary depending on the voice recognition technology used, as does the way they are handled in the voice application. Thus for example it is conceivable that a voice application sends the user a query if words are not reliably recognized. Thus for a voice recognition system the problem is to provide as precise and error-free an allocation as possible to one of the above-mentioned categories for each identification result.

Generally the basis for allocation to categories when classifying identification results is what is known as a confidence measure, which the voice recognition system calculates for each identification result. The literature provides a multitude of algorithms for calculating this measure. Of significance is the framework in which suitable confidence measure threshold values are determined. These define the above-mentioned categories for reliability of recognition. It should be noted that a well chosen threshold depends not only on the language and the modeling used (e.g. Hidden Markov Model) but also on the speaker and the recognizer vocabulary.

Previous proposed solutions have been based on the costly, critical and not always suitable a-priori determination of confidence thresholds on the basis of databases in the laboratory. These are explained below for three types of voice recognition:

a) Speaker-independent (SI) voice recognition

Speaker-independent recognition is based for example on Hidden Markov modeling. It offers convenience for the user, since no special training (preliminary speech, enrollment) for the words to be recognized is required. However, the vocabulary to be recognized must be known a priori. Typically in phoneme-based voice recognition systems this is phonetic or graphemic information about the words to be recognized. There are standard methods for converting the graphemes of a word, i.e. its written form, into its phonetic form, which is the form required by the voice recognition system. Various methods exist for determining confidence threshold values, either at vocabulary level or at word level. These methods are based on analyzing the (in this case known) information about the (phonetic) word modeling.

b) Speaker-dependent (SD) voice recognition

An example of speaker-dependent recognition is directory name selection for a cell phone. The names from the telephone directory are typically trained beforehand on a speaker-dependent basis (SD enrollment). Based on the spoken form of a word an acoustic model is generated for recognition. The standard methods of speaker-independent recognition do not apply here, and the thresholds for Si recognition are not transferable. Moreover there is a strong reliance on the chosen method of speaker-specific word modeling. Pre-set confidence measure threshold values for speaker-dependent vocabularies are typically not adapted to a speaker or a vocabulary and thus are per se less than optimal. It may even be the case that they cannot be used at all.

The known proposed solutions also include the—not very desirable—situation in which the user exerts direct influence on the thresholds, i.e. the user is forced to influence the 'severity' of rejection in the recognition system himself.

c) Speaker-adaptive (SA) voice recognition

This is a hybrid form of speaker-independent and speaker-dependent recognition: speaker-independent modeling of a word or vocabulary is adapted to a speaker by adaptive training. The aim is to improve the recognition rate by capturing speaker-specific characteristics. Depending on the recognition technology used, adaptation to a speaker can be at phoneme level or word level. Similar to the case of SD, no solutions are known for taking account of the effect of the additional training/adaptation process on the confidence threshold.

SUMMARY

Based on this, an aspect is to enable a meaningful determination of confidence measures and confidence thresholds, particularly for speaker-dependent and speaker-adaptive voice recognition.

Accordingly a theoretic identification result is specified in a method for determining confidence measures in voice recognition for a recognition process. The recognition process is performed and the confidence measure of the theoretic identification result is determined on the basis of information obtained when the recognition process is performed.

Preferably a confidence threshold is defined, taking account of the confidence measure. This procedure is used in particular in speaker-dependent or speaker-adaptive voice recognition.

In particular when the voice recognition is speaker-independent or speaker-adaptive, a confidence threshold can already be specified and the confidence threshold is adapted taking into account the confidence measure.

The confidence threshold is advantageously a confidence threshold for classification of identification results into categories. Here the categories for example include a category in which an utterance to be recognized is deemed as reliably recognized, a category in which an utterance to be recognized is deemed as unreliably recognized, and/or a category to which utterances are assigned which do not form part of the vocabulary to be recognized.

If the method is a method for speaker-independent or speaker-adaptive voice recognition, the theoretic identification result is predefined, because an utterance predefined for the user is recognized in the recognition process.

In contrast, if the method is a method for speaker-dependent voice recognition, the user is advantageously requested to speak an utterance to be recognized at least twice, once with the identification result supplying the theoretic identification result, and once with, among other things, the confidence measure of the theoretic identification result also being determined.

An arrangement which is set up to execute one of the methods outlined can be implemented for example by programming and setting up a data processing system programmed to perform the method disclosed herein.

A program product for a data processing system that contains code sections with which one of the outlined methods can be executed on the data processing system can be executed by suitably implementing the method in a programming language and converting it into code that can be executed by the data processing system. The code sections are stored for this purpose. A program product is here understood to mean the program as a marketable product. It can come in any form, for example on paper, a computer-readable data medium or via a network.

BRIEF DESCRIPTION OF THE DRAWINGS

These and other objects and advantages will become more apparent and more readily appreciated from the following description of exemplary embodiments, taken in conjunction with the accompanying drawings of which:

FIG. 1 is a flow chart of a speaker-adaptive training process with adaptation of confidence thresholds;

FIG. 2 is a flow chart of a speaker-dependent training process with adaptation of confidence thresholds;

FIG. 3 is a flow chart of a recognition process with adaptation of confidence thresholds.

DETAILED DESCRIPTION OF THE PREFERRED EMBODIMENT

Reference will now be made in detail to the preferred embodiments, examples of which are illustrated in the accompanying drawings, wherein like reference numerals refer to like elements throughout.

The method presented here is based on using information obtained when a recognition process is performed, in which the theoretic identification result is known.

In speaker-adaptive training the user is shown the word to be spoken, so the theoretic result is known. This also applies for speaker-specific training, since the user speaks the word to be added to the vocabulary of the speaker-dependent voice recognition system. In this case of speaker-dependent voice recognition it is however necessary for the word to be added to be spoken twice, since otherwise no word model exists that could serve as a theoretic identification result. However, this condition is met in very many cases, since most current voice recognition systems require duplicate training of the speaker-dependent voice recognition system for a variety of reasons.

Finally the method can additionally be used generally in a recognition process if it is known whether the identification result is correct or this knowledge can be deduced—possibly from the response of the user. This relates to all the above cases of speaker-independent, speaker-dependent and speaker-adaptive voice recognition.

In each of these applications of the method the utterances used for determining or adapting/improving confidence thresholds are specific to the speaker and the vocabulary to be recognized. This is precisely the weakness of the methods described under the related art.

The method described here is ideally suited for determining optimum confidence threshold values for the speaker in question (for the above instances of speaker-dependent and speaker-adaptive voice recognition) or for adapting the confidence threshold values (for the above instances of speaker-independent and speaker-adaptive voice recognition).

FIG. 1 shows a speaker-adaptive training process with adaptation of the confidence thresholds. The user performs an adaptation process in which he speaks words specified by the voice recognition system. A recognition process is performed for every utterance by the user and the confidence measure of the theoretic identification result is determined. Thus the confidence thresholds for category allocation are either defined or, if an iteration value already exists, adapted as appropriate. In contrast to previous methods, these confidence thresholds are optimally adapted to the user. Depending on the type of adaptation technology used, they are also specific to the recognition vocabulary and thus for example permit an improved rejection for this.

FIG. 2 shows a speaker-dependent training process with adaptation of the confidence thresholds. The user first speaks the word to be added to the vocabulary once. From this data the recognition system generates a speaker-dependent reference word model, which is provisionally included in the vocabulary. Then the user says the word again. This second run-through is in any case required by most voice recognition systems on the market for reasons of safeguarding, verifying and increasing the recognition performance. This second utterance prompts a recognition process and determines the confidence measure for the word model of the first run-through, this representing the theoretic identification result. Thus the confidence thresholds for category allocation are either defined or, if an iteration value already exists, are adapted as appropriate. These confidence thresholds are optimally adapted to user and vocabulary.

FIG. 3 shows the sequence in a recognition process entailing adaptation of the confidence thresholds. The user performs a recognition process. In line with the above precondition the theoretic result is known or can be deduced. For this theoretic recognition result the confidence measure for the utterance is determined, and the confidence thresholds for category allocation are adapted accordingly. In contrast to the existing related art these confidence thresholds are optimally adapted to user and vocabulary.

The method described has the advantage that the query and rejection behavior of a voice recognition system and thus user acceptance is significantly improved, since confidence thresholds are determined auto-adaptively and optimally for the user in question and are adapted accordingly, confidence thresholds are determined auto-adaptively and optimally for the vocabulary in question and are adapted accordingly, The costly and critical a-priori determination of confidence thresholds is no longer necessary or at any rate diminishes considerably in importance, since the method offers the possibility of exchanging confidence thresholds iteratively for optimum values.

A particular feature here is the use of recognition processes with a known theoretic identification result. The method enables these to be analyzed to determine a specific confidence measure. Thus for the first time a realistic results classification for speaker-dependent and speaker-adaptive voice recognition is possible.

The method can be used with different algorithms, described in the literature, for calculating a confidence measure.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide v. DIRECTV*, 358 F3d870, 69 USPQ2d1865 (Fed. Cir. 2004).

The invention claimed is:

1. A method for voice recognition, comprising:
deducing and/or specifying a theoretic identification result for a recognition process of an utterance in a voice recognition system;
receiving a spoken theoretic identification result based upon other recognition process of the utterance from a user;
further adapting a confidence measure of the theoretic identification result for recognition of the utterance, according to the spoken theoretic identification result;
adapting a confidence threshold taking into account the confidence measure; and
classifying theoretic identification results into categories based on the confidence threshold,
wherein the categories include at least one of a first category in which an utterance to be recognized has been determined to be reliably recognized, a second category in which the utterance to be recognized has been determined to be unreliably recognized, and a third category in which it has been determined that the utterance does not form part of a vocabulary to be recognized.

2. The method as claimed in claim 1, further comprising defining a confidence threshold, taking into account the confidence measure.

3. The method as claimed in claim 1, wherein the method uses one of speaker-independent and speaker-adaptive voice recognition and a predefined utterance for the user is recognized in the recognition process.

4. The method as claimed in claim 3,
wherein the method uses speaker-dependent voice recognition, and
further comprising receiving the utterance to be recognized from the user for said deducing of the theoretic identification result, prior to said receiving of the utterance to be recognized from the user as the spoken theoretic identification result.

5. A voice recognition system, comprising:
a device to receive a spoken theoretic identification result based upon an utterance from a user; and
at least one processor programmed to deduce and/or specify a theoretic identification result for a recognition process of the utterance in said voice recognition system, further adapting a confidence measure of the theoretic identification result for recognition of the utterance, according to the spoken theoretic identification result, adapt a confidence threshold taking into account the confidence measure, and classify theoretic identification results into categories based on the confidence threshold,
wherein the categories include at least one of a first category in which an utterance to be recognized has been determined to be reliably recognized, a second category in which the utterance to be recognized has been determined to be unreliably recognized, and a third category in which it has been determined that the utterance does not form part of a vocabulary to be recognized.

6. The voice recognition system as claimed in claim 5, wherein said at least one processor is further programmed to define a confidence threshold, taking into account the confidence measure.

7. The voice recognition system as claimed in claim 5, wherein said at least one processor is further programmed to use one of speaker-independent and speaker-adaptive voice recognition and a predefined utterance for the user is recognized in the recognition process.

8. The voice recognition system as claimed in claim 7, wherein said at least one processor is further programmed to use speaker-dependent voice recognition, and to receive the utterance to be recognized from the user for said deducing of the theoretic identification result, prior to receiving of the utterance to be recognized from the user as the spoken theoretic identification result.

9. A non-transitory computer-readable medium encoded with a computer program that when executed on a data processing system performs a method for voice recognition, comprising:
deducing and/or specifying a theoretic identification result for a recognition process of an utterance in a voice recognition system;
receiving a spoken theoretic identification result based upon other recognition process of the utterance from a user;
further adapting a confidence measure of the theoretic identification result for recognition of the utterance, according to the spoken theoretic identification result;
adapting a confidence threshold taking into account the confidence measure; and
classifying theoretic identification results into categories based on the confidence threshold,
wherein the categories include at least one of a first category in which an utterance to be recognized has been determined to be reliably recognized, a second category in which the utterance to be recognized has been determined to be unreliably recognized, and a third category in which it has been determined that the utterance does not form part of a vocabulary to be recognized.

10. The non-transitory computer-readable medium as claimed in claim 9, the method further comprising defining a confidence threshold, taking into account the confidence measure.

11. The non-transitory computer-readable medium as claimed in claim 9, wherein the method uses one of speaker-independent and speaker-adaptive voice recognition and a predefined utterance for the user is recognized in the recognition process.

12. The non-transitory computer-readable medium as claimed in claim 11,
wherein the method uses speaker-dependent voice recognition, and
wherein the method further comprises receiving the utterance to be recognized from the user for said deducing of the theoretic identification result, prior to said receiving of the utterance to be recognized from the user as the spoken theoretic identification result.

* * * * *